Figure 1:
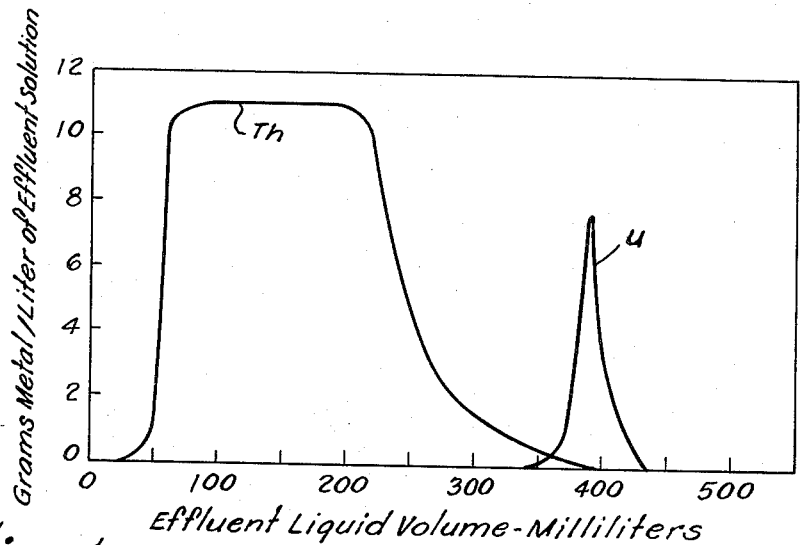

Sept. 3, 1963  H. SMALL  3,102,782
SOLVENT EXTRACTION PROCESS FOR THE RECOVERY OF URANIUM AND
RARE EARTH METALS FROM AQUEOUS SOLUTIONS
Filed March 23, 1959

INVENTOR.
Hamish Small
BY
Griswold & Burdick
ATTORNEYS

United States Patent Office 3,102,782
Patented Sept. 3, 1963

3,102,782
SOLVENT EXTRACTION PROCESS FOR THE RECOVERY OF URANIUM AND RARE EARTH METALS FROM AQUEOUS SOLUTIONS
Hamish Small, Midland, Mich., assignor to The Dow Chemical Company, Midland, Mich., a corporation of Delaware
Filed Mar. 23, 1959, Ser. No. 801,164
4 Claims. (Cl. 23—14.5)

This invention relates to the recovery of heavy metal values from aqueous solutions, and particularly to the recovery of uranium and/or rare earth metals, by solvent extraction. It relates more particularly to compositions comprising an organic liquid solvent or complexing agent for heavy metal values dissolved in a water-insoluble copolymer in particulate form and pertains especttially to an improved process for the recovery of heavy metal values from aqueous solutions by solvent extraction.

It is known to recover heavy metal values from aqueous solutions by extraction with a water-immiscible or a substantially water-immiscible organic solvent. For example, it has been proposed to extract uranium values from aqueous solutions with diethyl ether, tributyl phosphate or a mixture of tributyl phosphate and kerosene or carbon tetrachloride.

It has also been proposed to recover heavy metal values from aqueous solutions by dissolving an organic water-immiscible complexing agent, e.g. tributyl prosphate in a molten wax such as petroleum wax or polyethylene having a melting point between 200 and 220° F., cooling the solution of the wax and the complexing agent, disintegrating the wax complex to a granular form and contacting the granular material with the metal-containing solution to be processed, whereby the metal values are taken up by the wax-solvent complex.

However, the methods heretofore proposed for the recovery of heavy metal values from aqueous solutions have not been entirely satisfactory because an emulsion frequently forms during the contact of aqueous and organic liquid media and phase separation becomes difficult or sometimes even impossible. The employing of the complexing agent dissolved in a wax makes it difficult to obtain good contact of the aqueous solution with the complexing agent because of the natural non-wettability of the wax.

It is an object of the invention to provide an improved process for the recovery of heavy metal values from aqueous solutions by solvent extraction with new gel-like water-insoluble solvent-containing resin compositions. Another object is to provide new compositions of matter comprising water-insoluble gel-like solvent-containing alkenyl aromatic resin granules having good wettability and suitable for the recovery of heavy metal values from aqueous solutions. Still another object is to provide an improved process for the recovery of heavy metal values from aqueous solutions wherein a small volume of liquid extractant contained in a permeable copolymer matrix is employed to contact a relatively large volume of aqueous solution. Other and related objects may appear from the following description of the invention.

According to the invention the foregoing and related objects are attained by bringing an aqueous solution containing heavy metal values dissolved therein as solute into contact with discrete granules of a cross-linked insoluble alkenyl aromatic resin consisting essentially of a copolymer of a predominant amount of a monoalkenyl aromatic hydrocarbon and a minor proportion of a divinyl aromatic hydrocarbon, having on the surface of said copolymer granules substituent hydrophile groups of the formula —SO$_3$X wherein X represents a member of the group consisting of hydrogen and a metal, which resin granules are swollen with an organic liquid comprising an organic water-immiscible complexing agent or solvent for the heavy metal value, whereby the heavy metal values are rapidly and efficiently sorbed by the complexing agent in the resin granules, and after separating from the metal-depleted aqueous waste solution the heavy metal values are readily eluted or extracted from the resin granules by washing them with water or an aqueous solution.

The alkenyl aromatic resins to be employed in the process are the normally hard insoluble cross-linked copolymers of one or more monoalkenyl aromatic hydrocarbons having the general formula:

wherein Ar represents an aromatic hydrocarbon of the benzene series and R represents a member of the group consisting of hydrogen and the methyl radical. Examples of suitable monoalkenyl aromatic hydrocarbons are styrene, vinyltoluene, vinylxylene, ar-ethylvinylbenzene, isopropylstyrene, tert.-butylstyrene, ar-ethylvinyltoluene and the like. The copolymers contain from 92 to 99.5 percent by weight of one or more of the monoalkenyl aromatic hydrocarbons chemically combined or interpolymerized with from 8 to 0.5 percent by weight of a divinyl aromatic hydrocarbon such as divinylbenzene, divinyltoluene, divinylxylene or the like. Such copolymers can be prepared in usual ways employing procedures similar to those employed for the polymerization of styrene. For example, the copolymers can be prepared by polymerizing a mixture of the monomers in mass, i.e. in the substantial absence of an inert solvent, or in an aqueous dispersion such as water or brine. Polymerization of the monomers while dispersed in an aqueous medium is preferred since it affords ready control of the reaction and results in the production of the copolymer in a granular or bead form.

The polymerization is accelerated by the use of a per-oxy catalyst such as benzoyl peroxide, tert.-butyl hydroperoxide, cumene peroxide, di-tert.-butyl peroxide, cumene hydroperoxide and the like, and is usually carried out at temperatures between about 60° and 130° C. at atmospheric or superatmospheric pressure.

It is important that the granules of the alkenyl aromatic resin contain on the surface thereof hydrophile groups of the formula —SO$_3$X wherein X represents a member of the group consisting of hydrogen and a metal, i.e. sulfonate groups such as the sulfonic acid group or a salt thereof, in an amount sufficient to lend wettability to the resin granules by aqueous solutions, but insufficient to result in deleterious effects on the resin granules such as cracking, breaking or spalling, when the granules are subsequently swelled in an organic liquid such as a mixture of a complexing agent and an inert solvent capable of swelling or dissolving polystyrene. The alkenyl aromatic resin granules can contain sulfonate groups, preferably on the surface thereof in amount corresponding to from 0.001 to 0.150 milliequivalent of hydrogen per gram of the dry resin granules. A lesser amount of sulfonate groups results in resin granules having poor wettability with aqueous media, whereas greater amounts of the sulfonate groups, e.g. 0.21 sulfonate group per gram of the dry resin, results in disintegration of the resin granules upon swelling in an organic liquid.

Surface sulfonation of the copolymer granules can be carried out by reacting the granular copolymer with sulfuric acid, chlorosulfonic acid or sulfur trioxide and at temperatures between about −20° and 100° C. depending for the most part upon the sulfonating agent employed, and in the presence or absence of an inert diluent. A preferred method of surface sulfonating the copolymer granules is to suspend the copolymer granules in concentrated sulfuric acid, e.g. 98 percent sulfuric acid, and carry out the reaction at temperatures between 80° and 100° C., suitably for a time of from about 1 to 120 minutes at atmospheric pressure or thereabout. Upon completing the sulfonating reaction the copolymer is separated from the reaction mixture by filtering and is washed with water and dried.

As complexing agents or solvents for the heavy metal values alkyl phosphates show a preferred solubility for uranium values, and alkyl phosphates containing from 4 to 8 carbon atoms in an alkyl group can be employed. Such alkyl phosphates have the general formula:

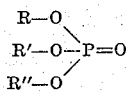

wherein R, R' and R'' independently represent an alkyl radical containing from 4 to 8 carbon atoms. Examples of suitable alkyl phosphates are tributyl phosphate, trioctyl phosphate, trihexyl phosphate, tri-(2-ethylhexyl)-phosphate, dibutylhexyl phosphate, dibutyloctyl phosphate, dioctylbutyl phosphate or dihexylbutyl phosphate.

The alkyl phosphates are preferably employed in admixture with an organic liquid solvent which is a swelling agent for the copolymer. Examples of suitable swelling agents are aromatic hydrocarbons such as benzene, toluene, xylene, ethylbenzene, ethyltoluene, isopropylbenzene, or aliphatic chlorohydrocarbons, e.g. methylene chloride, perchloroethylene, trichloroethylene, carbon tetrachloride, chloroform, 1,1,1-trichloroethane, ethylene dichloride, 1,1,2 - trichloroethane, 1,1,1,2 - tetrachloroethane, or 1,1,2,2-tetrachloroethane. The swelling agent and the complexing agent can be used in proportions of from about 5 to 80 percent by volume of the swelling agent and from 95 to 20 percent by volume of the complexing agent.

The copolymer granules containing hydrophile sulfonate groups can be impregnated to form the gel-like solvent-containing compositions by soaking the copolymer granules in a mixture of the alkyl phosphate and an organic swelling agent, e.g. toluene or perchloroethylene, as hereinbefore defined at between about 20° and 100° C. and at atmospheric pressure or thereabout. In a preferred procedure the copolymer granules are suspended in a mixture of the alkyl phosphate, e.g. a mixture of equal parts by volume of tributyl phosphate and perchloroethylene, until swelled, then are transferred to a column and the solvent mixture is passed through the bed of the resin granules until the effluent liquid is of substantially the same concentration as the feed liquid, while maintaining the copolymer and liquid mixture at elevated temperatures between about 60° and 100° C. Such procedure results in rapid equilibration of the copolymer particles to form discrete gel-like solvent-containing compositions. After equilibrating the copolymer granules with the solvent mixture the excess liquid is drained from the resin granules and they are washed with water. The gel-like solvent-containing copolymer composition is then in a form suitable for the recovery of heavy metal values from aqueous solutions, e.g. the recovery of uranyl nitrate from an aqueous solution containing the same as solute.

The aqueous solutions to be treated in accordance with the invention can be aqueous solutions of the salts of heavy metals such as uranium and thorium or salts of rare earth metals, and may be free from acid or may contain free mineral acid such as nitric acid, sulfuric acid or hydrochloric acid, e.g. in a concentration up to about a 5-normal aqueous solution of the acid, and may contain a salting-out agent, i.e. an inorganic compound which is highly soluble in water and which, when added in sufficient amounts to an aqueous salt solution to be extracted, promotes the interchange of the salt into an organic solvent therefor. The concentration of the heavy metal salts in the solution to be treated can vary widely, but is advantageously of a concentration between about 1 and 20 grams of the heavy metal salt per liter of the aqueous solution.

The solution to be treated can be contacted with the discrete particles of the alkenyl aromatic resin containing the alkyl phosphate complexing agent by mixing the resin particles with the aqueous solution and thereafter separating the solution from the resin granules. In a preferred practice the resin particles are placed in a suitable vessel such as a vertical column to form a bed of the resin. The aqueous solution containing the heavy metal salt to be extracted is contacted with the resin by either upflow or downflow of the aqueous solution through the bed at suitable rates of flow, e.g. at from 0.1 to 10 gallons of the aqueous solution per square foot of cross-sectional area of the resin bed per minute, and at room temperature or thereabout, although the process can be carried out at elevated temperatures. Flow of the aqueous solution through the bed of the resin is continued until the resin has sorbed its capacity or substantially its capacity of the heavy metal salt from the solution. Thereafter, flow of the aqueous feed solution is discontinued and the residual liquid surrounding the resin granules is drained or flushed from the bed.

The metal-containing resin granules can then be treated or washed with water or an aqueous solution containing a mineral acid such as nitric acid, sulfuric acid or hydrochloric acid, to elute or displace the sorbed metal. The wash solution can be water or an aqueous solution containing a mineral acid in a concentration between about a 0.1 normal and a 5 normal solution and/or containing a salting-out agent, e.g. sodium nitrate. By this procedure the alkenyl aromatic resin granules are stripped of the sorbed heavy metal values and are regenerated to a form suitable for re-employment in another cycle of the operations.

The following examples illustrate ways in which the principle of the invention has been applied, but are not to be construed as limiting its scope.

EXAMPLE 1

In each of a series of experiments, a copolymer prepared by polymerizing a mixture of monomers consisting of styrene, together with a mixture of approximately 55 percent by weight of divinylbenzene and 45 percent of ethylvinylbenzene, in an aqueous suspension to form copolymer beads cross-linked with divinylbenzene in amount as stated in the following table, was reacted with sulfuric acid to sulfonate the surface of the copolymer beads. The copolymer beads employed in the experiments were of sizes between 50 and 100 mesh per inch as determined by U.S. Standard screens. A charge of 100 grams of the copolymer beads was mixed with 500 grams of concentrated (98 percent) sulfuric acid maintained at temperatures between 90° and 95° C. on a steam bath. The resulting mixture was stirred for a time as stated in the following table, then was removed from the steam bath and the copolymer separated from the sulfuric acid by filtering. The copolymer was immediately washed with a large volume of water and was dried. The dried copolymer was analyzed to determine the degree of sulfonation. The procedure for determining the degree of sulfonation was to measure the hydrogen ion content of a weighed portion of the sulfonated copolymer beads by potentiometric titration and calculate the capacity in milliequivalents of hydrogen per gram of the dry sulfonated copolymer. A charge of approximately 60 grams of the surface sulfonated copolymer beads was suspended in a mixture of 60 parts by volume of tributylphosphate and 40 parts by volume of perchloroethylene at a temperature of 80° C. to swell the copolymer. The swelled beads were transferred to a 0.75-inch internal diameter steam jacketed glass column to form a bed of the copolymer beads 12 inches deep. The bed was maintained at a temperature of 100° C. while passing the solvent mixture downflow through the bed until the effluent liquid was of the same composition as the feed solution, i.e. until equilibrium was established between the solvent mixture within the copolymer beads and the solvent mixture surrounding the copolymer beads. The swelled copolymer and liquid were removed from the column and were allowed to cool to room temperature. The copolymer was separated from the liquid by filtering, then was washed with water to remove the solvent adhering to the surfaces of the copolymer beads. The washing was continued until the copolymer beads were free from adhered solvent. The beads were damp dried by suction in the filter and were analyzed to determine the composition of the solvent mixture within the swelled copolymer beads. A charge of 40 grams of the damp dried copolymer beads swelled with the solvent mixture of tributyl phosphate and perchloroethylene was placed in a 0.5-inch internal diameter glass column to form a bed of the copolymer beads. The column was held in a vertical position and was filled with an aqueous 2-normal sodium nitrate solution to the top level of the bed of the copolymer beads. A feed solution consisting of an aqueous solution containing 5 grams of uranium in the form of uranyl nitrate, $UO_2(NO_3)_2$, 170 grams of sodium nitrate and 6.3 grams of nitric acid, per liter of the solution, was passed downflow through the bed of the copolymer beads at a rate of 2 ml. of the solution per minute. The effluent liquid was collected in successive 2 ml. fractions and was analyzed. The capacity of the swelled copolymer beads containing the solvent mixture for absorbing uranyl nitrate from the aqueous feed solution was determined by observing the break-through point of uranyl nitrate in the effluent liquid. The capacity is expressed in milligrams of uranium absorbed per gram of the solvent-swelled copolymer beads. Table I identifies the experiments and gives the percent by weight of divinylbenzene in the copolymer beads, the time in minutes for which the copolymer beads were surface sulfonated and the degree of sulfonation expressed as milliequivalents of hydrogen per gram of the dry sulfonated beads. The table also gives the composition of the swelled copolymer beads in percent by weight of copolymer, percent by weight of tributylphosphate and percent by weight of perchloroethylene in the swelled beads. The table gives the capacity of the swelled copolymer beads for absorbing uranyl nitrate from the aqueous feed solution expressed as milligrams of uranium per gram of the solvent-swelled copolymer beads. In the table the symbol DVB is employed to indicate divinylbenzene, for brevity.

*Table I*

| Run No. | Starting materials | | | Product—Composition | | | Capacity, mg./gm. |
|---|---|---|---|---|---|---|---|
| | Styrene-DVB-Copolymer DVB, percent | Sulfonation | | Copolymer, percent | Tributyl phosphate, percent | Perchloroethylene, percent | |
| | | Time, min. | Degree, meq./gm. | | | | |
| 1 | 0.5 | 2 | 0.0021 | 21 | 39 | 40 | 78 |
| 2 | 1 | 3 | 0.0051 | 37 | 32 | 31 | 72 |
| 3 | 2 | 20 | 0.006 | 44 | 26 | 30 | 52 |
| 4 | 4 | 9 | 0.0036 | 51 | 24 | 25 | 43 |
| 5 | 6 | 12 | 0.0038 | 57 | 17 | 26 | 33 |
| 6 | 8 | 33 | 0.014 | 66 | 14 | 20 | 9 |

EXAMPLE 2

In each of a series of experiments, a copolymer of 96.4 percent by weight of styrene, 1.6 percent of ethylvinylbenzene and 2 percent of divinylbenzene, in the form of beads of sizes between 50 and 100 mesh per inch as determined by U.S. Standard screens, which copolymer beads were surface sulfonated to a degree corresponding to 0.006 milliequivalent of hydrogen per gram of the dry resin was swelled with a liquid solvent as defined in the following table employing procedure similar to that employed in the preceding example. A charge of 40 grams of the solvent-swelled copolymer beads was placed in a 0.5 inch internal diameter glass column to form a bed of the resin. The copolymer was tested for its capacity to adsorb uranyl nitrate from an aqueous solution employing procedure similar to that employed in Example 1. Table II identifies the experiments and gives the composition of the liquid solvent employed to swell the copolymer. The table also gives the composition of the swelled copolymer beads in percent by weight of the copolymer and the solvent dissolved therein, and gives the capacity of the swelled copolymer beads for absorbing uranyl nitrate from the aqueous solution, expressed as milligrams of uranium per gram of the solvent-swelled copolymer.

*Table II*

| Run No. | Solvent | | Product | | |
|---|---|---|---|---|---|
| | Tributyl phosphate, percent | Perchloroethylene, percent | Copolymer, percent | Tributyl phosphate, percent | Perchloroethylene, percent | Capacity, mg./gm. |
| 1 | 100 | | 74.5 | 25.5 | | 12 |
| 2 | 90 | 10 | 62.6 | 32 | 5.4 | 25 |
| 3 | 80 | 20 | 58 | 29 | 13 | 54.5 |
| 4 | 60 | 40 | 44 | 26 | 30 | 52 |
| 5 | 40 | 60 | 42.5 | 18.5 | 49 | 37 |
| 6 | 20 | 80 | 37.5 | 12.5 | 50 | 25 |
| 7 | 5 | 95 | 36.1 | 2.9 | 61 | 3.6 |

EXAMPLE 3

A charge of a copolymer of 92.8 percent by weight of styrene, 3.2 percent of ethylvinylbenzene and 4 percent of divinylbenzene, in the form of beads of sizes between 50 and 100 mesh per inch was surface sulfonated, employing procedure similar to that employed in Example 1, to a degree corresponding to a capacity of 0.0036 milliequivalent of hydrogen per gram of the copolymer. The surface sulfonated beads were suspended in a mixture of 60 parts by volume of tributyl phosphate and 40 parts by volume of perchloroethylene at room temperature for a period of 3 hours. Thereafter, the copolymer beads were separated by filtering and were washed with water. The beads were analyzed and found to consist of 57 percent by weight of copolymer, 21 percent by weight of tributyl phosphate and 22 percent by weight of perchloroethylene. The solvent-swelled copolymer beads had a capacity for adsorbing uranyl nitrate from aqueous solutions of 46 milligrams of uranium per gram of the swelled copolymer beads when tested by procedure similar to that employed in Example 1.

EXAMPLE 4

A copolymer of styrene cross-linked with 2 percent by weight of divinylbenzene and surface sulfonated to a degree corresponding to 0.006 millequivalent of hydrogen per gram of the copolymer similar to that employed in Example 2, was swelled in a solvent mixture consisting of equal parts by volume of tributyl phosphate and toluene. The swelled copolymer was analyzed and found to consist of 51 percent by weight of copolymer, 30 percent by weight of tributyl phosphate and 19 percent by weight of toluene. The solvent-swelled copolymer beads had a capacity for adsorbing uranyl nitrate from an aqueous solution of 64.5 milligrams of uranium per gram of the solvent-swelled copolymer.

EXAMPLE 5

A copolymer of styrene cross-linked with one percent by weight of divinylbenzene in the form of particles of sizes between 50 and 100 mesh per inch was surface sulfonated to a degree corresponding to 0.0051 milliequivalent of hydrogen per gram of the resin employing procedure similar to that described in Example 1. The sulfonated copolymer beads were swelled in a solvent consisting of a mixture of 40 parts by volume of trioctyl phosphate and 60 parts by volume of perchloroethylene. The swelled copolymer beads were analyzed and found to consist of 31 percent by weight of copolymer, 20 percent by weight of trioctyl phosphate and 49 percent by weight of perchloroethylene. The solvent-swelled copolymer had a capactiy for adsorbing uranyl nitrate from an aqueous solution of 24 milligrams of uranium per gram of the solvent-swelled copolymer when tested employing a solution of uranyl nitrate similar to that employed in Example 1.

EXAMPLE 6

A charge of 38 grams of solvent-swelled copolymer beads similar to that described in run No. 3 of Table I, was placed in a 0.5 internal diameter glass tube held in a vertical position to form a bed of the beads. The column was filled to the top level of the copolymer beads with an aqueous 2-normal sodium nitrate solution. The bed contained 45 ml. of the solvent-swelled copolymer beads and 17 ml. of aqueous liquid surrounding the beads. A feed solution consisting of an aqueous solution containing 10.55 grams of uranyl nitrate, $(UO_2(NO_3)_2 \cdot 6H_2O)$, 170 grams of sodium nitrate and 1.6 grams of nitric acid per liter of the solution was fed to the bed at a rate of 2 ml. of the solution per minute, and passed downflow through the bed of the copolymer beads, while withdrawing effluent liquid from the bottom of the column at a rate corresponding to the rate of feed to the bed. The effluent liquid was collected in successive 5 ml. fractions. The fractions were analyzed to determine the amount of uranyl nitrate therein. After the solvent-swelled beads had absorbed their capacity of uranyl nitrate, feed of the solution to the bed was discontinued and the liquid surrounding the copolymer beads was flushed therefrom with water. The feed of water to the bed was continued at a rate of 2 ml. per minute to elute the sorbed uranyl nitrate from the swelled copolymer beads. The sorbed uranyl nitrate was quantitatively eluted from the solvent-swelled copolymer beads with 60 ml. of water. The operations of adsorbing the uranyl nitrate from the feed solution in the solvent-swelled copolymer beads containing tributyl phosphate and elution of the sorbed uranyl nitrate from the solvent-swelled copolymer beads by washing with water was repeated over a series of three cycles with substantially similar results.

EXAMPLE 7

A copolymer of 92.8 percent by weight of styrene, 3.2 percent of ethylvinylbenzene and 4 percent of divinylbenzene, in the form of beads of sizes between 30 and 50 mesh per inch as determined by U.S. Standard screen, was surface sulfonated to a degree corresponding to 0.006 milliequivalent of hydrogen per gram of the sulfonated copolymer beads employing procedure similar to that described in Example 1. The surface-sulfonated copolymer beads were swelled in a solvent mixture consisting of 60 parts by volume of tributyl phosphate and 40 parts by volume of perchloroethylene, then were washed with water. The swelled copolymer beads were analyzed and found to consist of 55 percent by weight copolymer, 20 percent tributyl phosphate and 25 percent perchloroethylene. A charge of 58.5 ml. of the solvent-swelled copolymer beads was placed in a vertical 0.5 inch internal diameter glass tube to form a bed of the copolymer beads. The column was filled with an aqueous 2-normal solution of sodium nitrate to the top level of the bed of the beads. Thereafter, 200 ml. of an aqueous solution containing 10.55 grams of uranyl nitrate $(UO_2(NO_3)_2 \cdot 6H_2O)$, 31.2 grams of ferric nitrate $(Fe(NO_3)_3 \cdot 6H_2O)$ and 252 grams of nitric acid per liter of the solution was fed to the column and passed downflow through the bed of the copolymer beads at a rate of one milliliter per minute. This was followed by the feed of 30 ml. of an aqueous 4-normal nitric acid solution to the column, after which water was fed to the column to elute the sorbed uranyl nitrate from the solvent-swelled copolymer beads. Effluent liquid was withdrawn from the bottom of the column at a rate corresponding to the rate of feed to the column. The effluent liquid was collected in successive 10 ml. fractions and was analyzed. The solvent-swelled copolymer beads selectively sorbed the uranyl nitrate from the aqueous feed solution. The ferric nitrate remained in the solution surrounding the copolymer beads as was determined by analysis of the effluent liquid. The sorbed uranyl nitrate was eluted from the solvent-swelled copolymer beads by the washing with water, and 94 percent of the sorbed uranyl nitrate was recovered in 120 ml. of the effluent liquid.

EXAMPLE 8

A charge of 50 ml. of a solvent-swelled copolymer composition similar to that described in run No. 4 of Table 1 was placed in a 0.5 inch internal diameter glass tube to form a bed of the copolymer beads. The column was filled with an aqueous 2-normal solution of sodium nitrate to the top level of the copolymer beads. A volume of 190 ml. of an aqueous feed solution containing 23.75 grams of thorium nitrate, $Th(NO_3)_4 \cdot 4H_2O$, 2.11 grams of uranyl nitrate, $UO_2(NO_3)_2 \cdot 6H_2O$, 176 grams of sodium nitrate and 6.3 grams of nitric acid per liter of the solution was fed to the column at a rate of 2 ml. of the solution per minute and was placed downflow through the bed of the copolymer beads. This was followed by the feed of 160 ml. of an aqueous solution containing 170 grams of sodium nitrate and 6.3 grams of nitric acid per liter of the solution, after which water was fed to the column to elute the sorbed metal salts from the solvent-swelled copolymer. Effluent liquid was withdrawn from the bottom of the column and was collected in successive fractions. The fractions were analyzed. Table III identifies the fractions and gives the total volume of the effluent liquid. The table also gives the concentration of the uranium and thorium in the fractions, expressed as grams of said metals per liter of the effluent liquid.

Table III

| Fraction No. | Effluent liquid volume ml. | Concentration of metals in effluent liquid | |
| --- | --- | --- | --- |
| | | Th, gm./l. | U, gm./l. |
| 1 | 30 | | |
| 2 | 40 | 4 | |
| 3 | 50 | 9.6 | |
| 4 | 60 | 10.3 | |
| 5 | 70 | 10.7 | |
| 6 | 80 | 10.9 | |
| 7 | 100 | 11.0 | |
| 8 | 190 | 11.0 | |
| 9 | 200 | 10.9 | |
| 10 | 210 | 10.7 | |
| 11 | 220 | 9.5 | |
| 12 | 240 | 6.1 | |
| 13 | 260 | 3.7 | |
| 14 | 280 | 2.3 | |
| 15 | 300 | 1.6 | |
| 16 | 320 | 1.1 | |
| 17 | 340 | 0.75 | 0.05 |
| 18 | 360 | 0.4 | 0.2 |
| 19 | 370 | 0.3 | 0.35 |
| 20 | 380 | 0.2 | 4.0 |
| 21 | 390 | 0.1 | 7.7 |
| 22 | 400 | | 3.6 |
| 23 | 420 | | 1.9 |
| 24 | 440 | | 0.8 |
| 25 | 460 | | 0.3 |
| 26 | 480 | | |

As shown in the above table, the uranyl nitrate was selectively sorbed by the solvent-swelled copolymer beads and was eluted from the beads by washing with water. FIG. 1 of the drawing is an elution curve showing the concentration of the metal salts in the effluent liquid.

EXAMPLE 9

A charge of 39 ml. of a solvent-swelled copolymer composition similar to that described in run No. 2 of Table 1 was placed in a 0.5 inch internal glass tube to form a bed of the swelled copolymer beads. The column was filled with an aqueous 2-normal sodium nitrate solution to the top level of the copolymer beads. A volume of 85 ml. of an aqueous solution containing thorium nitrate, $(Th(NO_3)_4 \cdot 4H_2O$ in a concentration corresponding to a 0.0432 molar solution, yttrium nitrate, $$Y(NO_3)_3 \cdot 6H_2O$$

in a concentration corresponding to a 2-normal solution and nitric acid in a concentration corresponding to a 0.1 normal solution was fed to the column at a rate of 2 ml. of the solution per minute and was passed downflow through the bed of the solvent-swelled copolymer beads. After feed of this solution, the bed was rinsed with 27 ml. of an aqueous solution containing 170 grams of sodium nitrate and 6.3 grams of nitric acid per liter of solution, then was washed with water to elute the sorbed metal values from the copolymer beads. The feed of all of the solutions to the bed was at a rate of 2 ml. of the solution per minute. Effluent liquid was withdrawn from the bottom of the column at a rate corresponding to the rate of feed to the column. The effluent liquid was collected as successive fractions and was analyzed. Table IV identifies the fractions and gives the volume of the effluent liquid in milliliters. The table also gives the concentration of the yttrium nitrate in the effluent liquid expressed as the ratio of grams of yttrium per liter of the effluent liquid divided by the grams of yttrium per liter of the feed solution. The thorium nitrate in the effluent liquid is expressed in similar units.

Table IV

| Fraction No. | Effluent liquid, ml. | Concentration of metals in effluent liquid, gm/liter of effluent/gm./liter of feed | |
| --- | --- | --- | --- |
| | | Y | Th |
| 1 | 20 | | |
| 2 | 30 | 0.85 | |
| 3 | 40 | 1.2 | |
| 4 | 50 | 1.3 | |
| 5 | 60 | 1.35 | |
| 6 | 80 | 1.35 | |
| 7 | 90 | 1.33 | |
| 8 | 100 | 0.80 | |
| 9 | 110 | 0.0 | 0.0 |
| 10 | 120 | | 0.4 |
| 11 | 130 | | 3.6 |
| 12 | 140 | | 2.65 |
| 13 | 150 | | 0.9 |
| 14 | 160 | | 0.0 |

Figure 2:
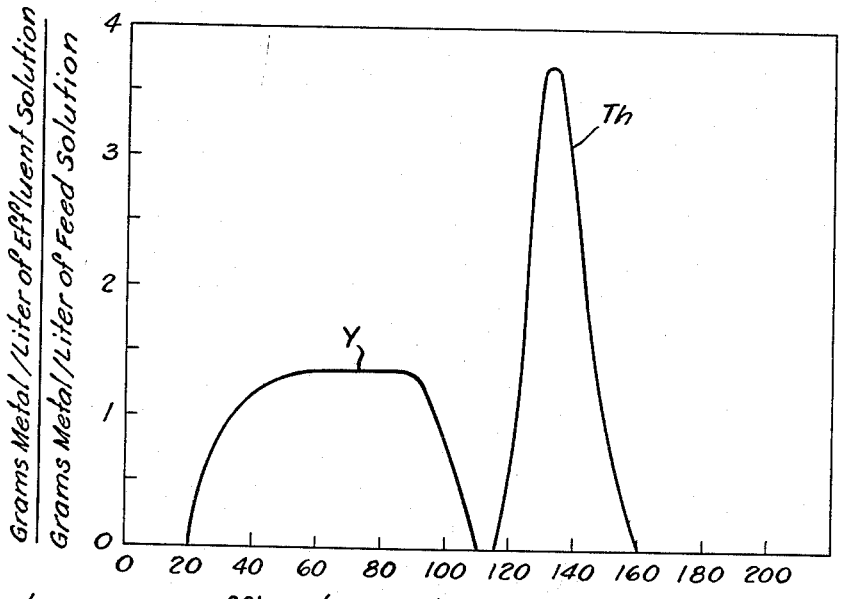

As shown in the above table, complete separation of the thorium nitrate from the yttrium nitrate was obtained. FIG. 2 is an elution curve showing the concentration of the metal salts in the effluent liquid and plotted from the data in Table IV.

EXAMPLE 10

A copolymer of 92.8 percent by weight of styrene, 3.6 percent of ethylvinylbenzene and 4 percent of divinylbenzene in the form of beads of sizes between 100 and 200 mesh per inch as determined by U.S. Standard screen and having the surfaces of the beads sulfonated to a degree corresponding to 0.0036 milliequivalent of hydrogen per gram of the resin was swelled in a solvent mixture consisting of tributyl phosphate and perchloroethylene, then was washed with water and analyzed. The solvent-swelled copolymer beads were found to consist of 55 percent by weight of copolymer, 20 percent by weight of tributyl phosphate and 25 percent by weight of perchloroethylene. A charge of 88 ml. of the solvent-swelled copolymer beads was placed in a 0.5 inch internal diameter glass tube to form a bed of the copolymer beads. The tube was filled to the top level of the copolymer beads with an aqueous solution of 10-normal ammonium nitrate. A volume of 10 ml. of an aqueous 0.1 normal nitric acid solution containing yttrium nitrate and ferric nitrate in concentrations corresponding to 40 grams of yttrium and 71 grams of iron per liter of the solution was fed to the bed at a rate of 2 ml. of the solution per minute, thereby displacing an equal volume of liquid from the bed.

This was followed by the feed of 10 ml. of an aqueous 10-normal ammonium nitrate solution to the bed at the same rate, after which water was fed to the bed at a rate of 2 ml. per minute. The effluent liquid from the bottom of the bed was collected as successive 2 ml. fractions, and was analyzed. Good separation of the yttrium nitrate from the ferric nitrate was obtained.

I claim:

1. In a process for recovering heavy metal values from an aqueous solution by solvent extraction with an organic substantially water-immiscible solvent, the improvement which consists in contacting the aqueous solution containing the heavy metal values dissolved therein as solute with discrete gel-like water-insoluble organic solvent-containing granules of a cross-linked insoluble alkenyl aromatic resin consisting essentially of a copolymer of from 92 to 99.5 percent by weight of at least one monoalkenyl aromatic hydrocarbon having the general formula:

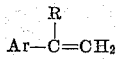

wherein Ar represents an aromatic hydrocarbon of the benzene series and R represents a member of the group consisting of hydrogen and the methyl radical, and from 8 to 0.5 percent by weight of a divinyl aromatic hydrocarbon of the benzene series, said copolymer granules containing on the surface thereof substituent hydrophile groups of the formula —SO$_3$X wherein X represents a member of the group consisting of hydrogen and a metal, in amount corresponding to from 0.001 to 0.150 milliequivalent of hydrogen ion per gram of said dry surface-sulfonated resin, which alkenyl aromatic resin granules are swollen with a water-immiscible organic liquid comprising a trialkyl phosphate having from 4 to 8 carbon atoms in each alkyl radical as complexing agent for said heavy metal values in said aqueous solution, and an organic liquid solvent which swells said alkenyl aromatic resin, in proportions corresponding to from 5 to 80 percent by volume of the organic swelling agent and from 95 to 20 parts by volume of the trialkyl phosphate, whereby the metal values are sorbed by the complexing agent in said resin granules, separating the treated aqueous solution from the solvent-containing resin granules and eluting the heavy metal values from the gel-like resin granules by washing said resin granules with an eluant solution comprising water.

2. A process according to claim 1, wherein the copolymer is a resinous copolymer of a predominant amount of styrene with lesser amounts of ethylvinylbenzene and divinylbenzene.

3. A process according to claim 1, wherein the complexing agent consists of a mixture of tributyl phosphate and perchloroethylene.

4. A process according to claim 1, wherein the complexing agent consists of a mixture of trioctyl phosphate and toluene.

References Cited in the file of this patent

UNITED STATES PATENTS

| | | |
|---|---|---|
| 2,764,563 | McMaster et al. | Sept. 25, 1956 |
| 2,812,233 | Lewis et al. | Nov. 5, 1957 |
| 2,848,300 | Warf | Aug. 19, 1958 |
| 2,859,092 | Bailes et al. | Nov. 4, 1958 |
| 2,877,213 | Eichhorn | Mar. 10, 1959 |
| 2,891,014 | Tsunoda et al. | June 16, 1959 |
| 2,894,806 | Elson | July 14, 1959 |
| 2,900,353 | Cassidy et al. | Aug. 18, 1959 |
| 2,963,453 | Hwa | Dec. 6, 1960 |